ELECTRICAL CODE TRANSLATOR

Filed Oct. 11, 1956

INVENTORS O. CESAREO
W. L. SHAFER, JR.
BY [signature]
ATTORNEY

United States Patent Office 2,919,439

Patented Dec. 29, 1959

2,919,439

ELECTRICAL CODE TRANSLATOR

Orfeo Cesareo, Washington Township, Bergen County, and William L. Shafer, Jr., Florham Park, N.J., assignors to Bell Telephone Laboratories, Incorporated, New York, N.Y., a corporation of New York

Application October 11, 1956, Serial No. 615,394

2 Claims. (Cl. 340—347)

Figure 1:
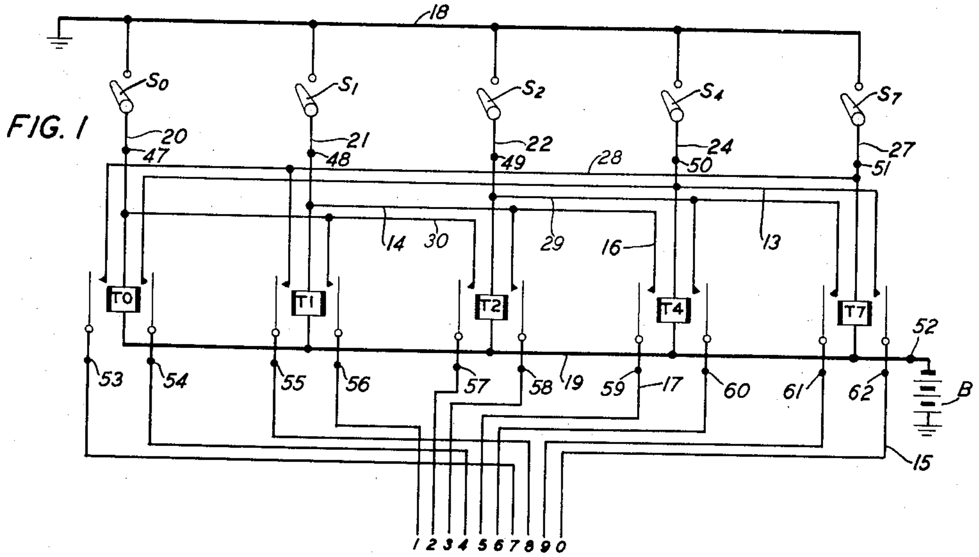

This invention relates to code translators and more particularly to translators which selectively establish a conducting path between a plurality of input conductors and one of a plurality of output conductors.

One specific type of code translator is known as a two-out-of-five to one-out-of-ten code translator. As described on page 9 of Bell Telephone System Monograph No. 1908 by H. H. Schneckloth, such a translator contains five switching devices each having four path-extending elements and associated wiring. Each of the switching devices is connected to a different one of five input conductors, and the twenty path-extending elements are so connected to each other, to an energized supply conductor, and to ten output conductors that, upon the operation of any two of the switching devices, a single path is established between the energized supply conductor and one of the output conductors, thus effecting the required translation. In this kind of translator no electrical connections are established between the input and output conductors.

A larger number of path-extending elements is utilized in the before-mentioned translator than in some other translators presently known. In such other translators, however, an unequal number of path-extending elements is associated with each switching device. It is advantageous to include an equal number of path-extending elements with each switching device in order that identical devices may be used, thereby reducing the cost of manufacture of the translators into which such devices are incorporated.

A two-out-of-five to one-out-of-ten code translator requiring fifteen path-extending elements is disclosed in Fig. 7 of Patent 2,572,699, granted October 23, 1951, to W. W. Carpenter et al. A code translator requiring only fourteen path-extending elements is disclosed in Fig. 12–12 on page 298 of "The Design of Switching Circuits," by W. Keister, A. E. Ritchie, and S. H. Washburn, D. Van Nostrand Company, Inc., New York, 1951. It is an object of the present invention to further simplify such translators by reducing to a minimum the number of path-extending elements required therein.

Another object of the invention is to provide a translator in which identical switching devices are used.

This invention comprises five input conductors; five switching devices, each one of which is connected to a different one of such input conductors; and ten output conductors selectively connected to the input conductors through ten path-extending elements actuated by the aforementioned switching devices. When two of the input conductors are energized according to a two-out-of-five code, the energization of such conductors results in the operation of their two connected switching devices which close their four associated path-extending elements. These four elements have been so positioned in a novel arrangement that their closing connects three output conductors to unenergized input conductors and a fourth output conductor to one of the two energized input conductors thereby energizing the fourth output conductor.

A feature of this invention is an arrangement wherein path-extending elements each responsive to the energization of a particular input conductor are bridged between selected input and selected output conductors thereby reducing to a minimum the number of such elements required.

Another feature of the present invention is a unique arrangement of five relays in which ten, and only ten, pairs of contacts or path-extending elements are required to translate information from a two-out-of-five to a one-out-of-ten code.

A further feature of this invention is a unique circuit arrangement wherein the five relays used may be identical, each having two, and only two, sets of contacts.

Figure 2:
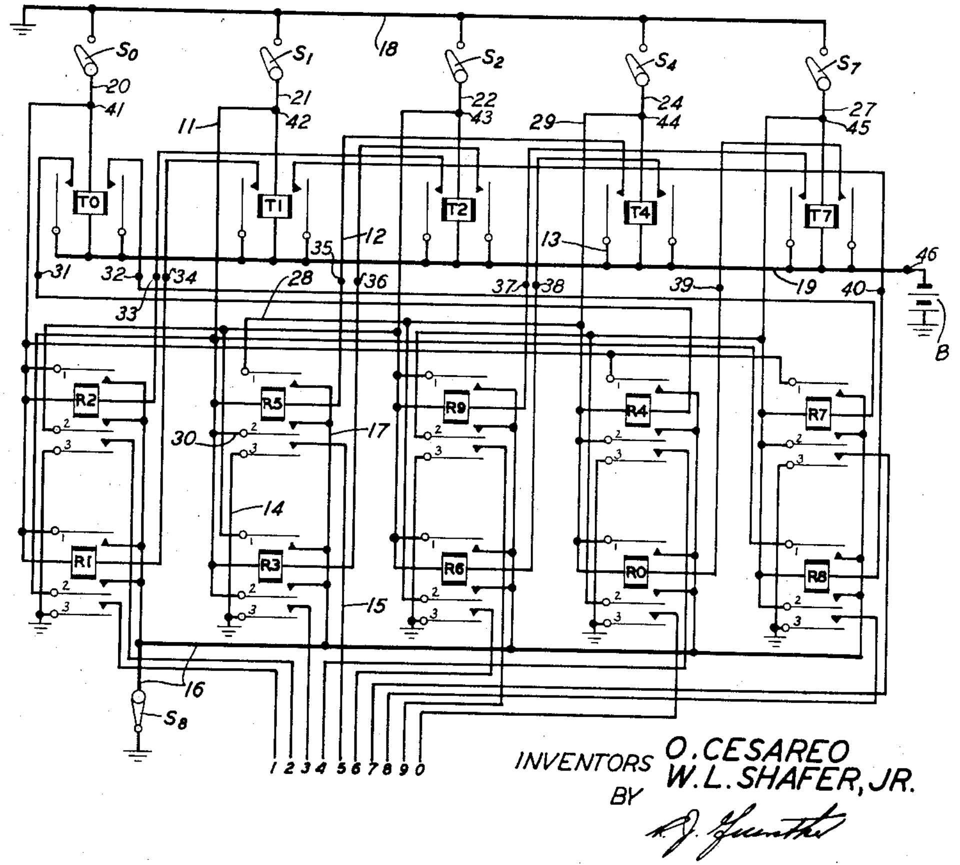

These and other features of the invention will be apparent from the following description, the appended claims, and the drawing in which:

Fig. 1 is a schematic diagram of a translator in which digits expressed in a two-out-of-five input code are translated into a one-out-of-ten output code; and Fig. 2 is a schematic diagram of a register having incorporated therein a translator similar to that shown in Fig. 1.

In Fig. 1, switches $S_0$ . . . $S_7$ are five switches which may be closed in combinations of two to express the digits zero through nine in the well-known two-out-of-five code. The expressions are as follows:

| Switches closed: | Digit expressed |
|---|---|
| $S_4$, $S_7$ | 0 |
| $S_0$, $S_1$ | 1 |
| $S_0$, $S_2$ | 2 |
| $S_1$, $S_2$ | 3 |
| $S_0$, $S_4$ | 4 |
| $S_1$, $S_4$ | 5 |
| $S_2$, $S_4$ | 6 |
| $S_0$, $S_7$ | 7 |
| $S_1$, $S_7$ | 8 |
| $S_2$, $S_7$ | 9 |

In each combination, the closing of two of the switches both expresses a digit and extends ground from conductor 18 to two of input conductors 20 . . . 27. Referring to the table, to translate an expression of the digit five, for example, the pair of switcthes $S_1$ and $S_4$ are closed, thereby expressing the digit and extending ground to input conductors 21 and 24 from conductor 18. Under such a condition relay T–4 is operated over a path from ground on conductor 18 through switch $S_4$, conductor 24, the winding of relay T–4, conductor 19, and battery B to ground. At the same time relay T–1 is operated over a similar and obvious path completed by switch $S_1$. Relay T–4, when operated, closes its pairs of contacts, thereby completing a path from conductor 18 through $S_1$, conductor 21, intermediate conductors 14 and 16, and the left contacts of relay T–4 to output conductor 17, which represents the digit five in the one-out-of-ten code. The right contacts of relay T–4 also close, but no path to ground from an output terminal is completed thereby since switch $S_2$ is open. Similarly, the operation of relay T–1 and the resulting closing of its pairs of contacts completes no path to ground since switches $S_7$ and $S_0$ are open.

As another example, in the two-out-of-five code as shown by the table above, the digit zero is expressed by the closing of switches $S_4$ and $S_7$ whereby ground is extended to input conductors 24 and 27 from conductor 18.

Under such a condition relay T–7 is operated over a path from conductor 18, through switch $S_7$, input conductor 27, the winding of relay T–7, conductor 19, and battery B to ground. At the same time, relay T–4 is operated over a similar and obvious path completed by $S_4$. Relay T–7, when operated, closes its pairs of contacts, thereby completing a path from conductor 18 through switch $S_4$, intermediate conductor 13, and the right contacts of relay T–7 to output conductor 15, which represents the digit zero in the one-out-of-ten code. The left contacts of relay T–7 close, as do the contacts of relay T–4, but no paths to ground are completed thereby since switches $S_1$ and $S_2$ are open. In a similar manner each of the other representations for digits zero through nine is translated from two-out-of-five to one-out-of-ten code.

In Fig. 2, switches $S_0$ . . . $S_7$ are five switches which may be closed in combinations of two to express the digits zero through nine as indicated heretofore in the description of Fig. 1. In each combination, the closing of the switches both expresses a digit and extends ground from conductor 18 to two of input conductors 20—27.

As in the case of Fig. 1, the digit five is expressed by closing switches $S_1$ and $S_4$, whereby ground is extended to input conductors 21 and 24 from conductor 18. Relay T–4 is operated over a path from conductor 18 through switch $S_4$, input conductor 24, winding of relay T–4, conductor 19, and battery B to ground. At the same time relay T–1 is operated over a similar and obvious path completed by switch $S_1$. Relay T–4, when operated, closes its left contacts which operate relay R–5 by energizing it over a path from conductor 18, through switch $S_1$, conductor 11, winding of relay R–5, conductor 12, the left contacts of relay T–4, conductors 13 and 19, and battery B to ground. Relay R–5, in operating, closes its number 3 contacts and thereby completes a path from ground on conductor 14 through the number 3 contacts of relay R–5 to output conductor 15, which expresses the digit five in the one-out-of-ten code. The provision of only one output conductor per digit, however, is purely exemplary. Where a plurality of electrically independent indications of a digit expressed in a one-out-of-ten code is desired, as for example the digit five, additional pairs of contacts may be added to relay R–5, with the one contact of each pair being extended to a suitably operative element in a circuit that requires an indication of the digit, and with the other of such pair of contacts being connected to ground or battery.

When relay R–5 operates, relays T–1 and T–4 are locked, the former over a path from ground, switch $S_8$, conductors 16 and 17, the number 2 contacts of relay R–5, and conductors 30 and 11 to the winding of relay T–1, and the latter from the same ground, through conductors 16 and 17, the number 1 contacts of relay R–5, and conductors 28 and 29 to the winding of relay T–4. Further, as long as relay T–4 is locked, relay R–5 remains connected to battery through the left contacts of relay T–4 and to ground through its own number 2 contacts, thereby holding R–5 in the operated position. This interlocking maintains on two of the input conductors 20 . . . 27 a condition equivalent to the original input condition, i.e., the extension of ground thereto, until the locking circuits are broken by opening normally closed switch $S_8$. The momentary opening of switch $S_8$ when switches $S_0$ . . . $S_7$ are open, returns all relays to normal and clears the register for the reception, translation and registration of further digits. The remainder of digits zero through nine are translated and registered in a similar manner, each of relays R–0 . . . R–9 serving both to indicate the number received and to establish an input condition which locks and holds the registration.

It is to be noted in connection with an examination of Fig. 2 that should the five identical relays T–0 . . . T–7 be packaged as a unit, the only internal wiring operation required is the comparatively simple one of joining one conductor of each relay operating coil and one contact of each pair of contacts to a common conductor 19. The resulting package has sixteen external terminals, three of the terminals 31 . . . 45 at each relay and a single terminal 46 for connection to battery. In contrast, although a package of the five identical relays T–0 . . . T–7 of Fig. 1 also has only sixteen external terminals 47 . . . 62, the required internal wiring operation includes making connections to six electrically isolated internal conductors 14, 16, 19, 28, 29 and 30. It will therefore be apparent that the five relay package $T_0$ . . . $T_7$ of Fig. 2 is more economical to manufacture than that of Fig. 1 since the required internal wiring of the former is substantially less complex than that of the latter.

Although the subject invention has been illustrated by particular embodiments thereof, the invention is not limited to the specific circuits therein disclosed. Various applications, modifications and arrangements of the invention will readily occur to those skilled in the art. For example, a two-out-of-six to one-out-of-twelve code translator could readily be constructed in accordance with the principles hereinbefore set forth. In addition, gas tubes or other switching elements could be utilized to perform the switching functions, thereby eliminating the requirement for relays.

The terms and expressions hereinbefore employed in reference to the invention are used as terms of description and not of limitation, and there is no intention in the use of such terms and expressions of excluding equivalents of the features shown and described or parts thereof, but on the contrary it is intended to include therein any and all equivalents, modifications and adaptations which may be employed without departing from the spirit of the invention.

What is claimed is:

1. A code translator comprising five input conductors representing in pairs items of information expressed in a two-out-of-five code, means for energizing said input conductors selectively in pairs, ten output conductors representing corresponding items of information expressed in a one-out-of-ten code, five relays connected one to each of said input conductors, a first of said relays being connected to a first conductor of an energized pair of input conductors and operated by the energization thereof, a second of said relays being connected to the second conductor of an energized pair of input conductors and operated by the energization thereof, two and only two normally open pairs of contacts associated with each of said relays, ten intermediate conductors connected two to each of said input conductors, one of the intermediate conductors connected to said first conductor of said energized pair of input conductors being connected to a first of the two pairs of contacts of said second relay, said first of said two pairs of contacts being further connected to a preselected one of said output conductors, whereby in response to the energization of said other input conductor said preselected output conductor is connected to said first conductor of said energized pair of input conductors and is energized thereby.

2. A code translator comprising a pair of energized input conductors, three unenergized input conductors, ten output conductors, a first relay connected to a first of said energized input conductors and energized thereby, a second relay connected to the second of said energized input conductors and energized thereby, three relays selectively connected to said three unenergized input conductors, two and only two normally open pairs of contacts associated with each of said relays, ten intermediate conductors connected two to each of said input conductors, a first one of said intermediate conductors being connected to said first of said energized input conductors, a first of the pairs of contacts associated with said second relay being connected between said first intermediate conductor and a preselected one of said output conductors, whereby a path is extended from said first of said energized input conductors over said first one of said intermediate conductors and said first of the pairs of contacts associated with said second relay to said preselected one of said output conductors.

References Cited in the file of this patent

Bell Telephone System Monograph #1908, page 9.